United States Patent
Schultz

[15] 3,659,789
[45] May 2, 1972

[54] THRUST NOZZLE FOR ROCKETS

[72] Inventor: Stephen D. Schultz, Brigham City, Utah

[73] Assignee: Thiokol Corporation, Bristol, Pa.

[22] Filed: Nov. 4, 1966

[21] Appl. No.: 592,209

[52] U.S. Cl..............239/265.19, 239/265.15, 239/265.35
[51] Int. Cl.................................B63h 11/10, B64c 15/00
[58] Field of Search..............239/265.15, 265.19, 265.33, 239/265.35

[56] References Cited

UNITED STATES PATENTS

| 1,629,767 | 5/1927 | Valdés | 239/265.35 |
| 3,136,250 | 6/1964 | Humphrey | 60/232 |
| 3,145,529 | 8/1964 | Maloof | 138/44 |

Primary Examiner—Samuel Feinberg
Attorney—Edward E. McCullough

[57] ABSTRACT

A fixed, convergent-divergent, rocket nozzle having a movable throat section seated in spherical relationship to adjacent surfaces; so that the rocket may be steered by rotating the throat section.

7 Claims, 3 Drawing Figures

Patented May 2, 1972

3,659,789

INVENTOR
STEPHEN D. SCHULTZ

BY

AGENT

THRUST NOZZLE FOR ROCKETS

This invention relates to improvements in thrust nozzles for rockets; and, more particularly, in such nozzles incorporating compact means for steering a rocket by altering the direction of the propulsive gases thereof.

A continuing objective in the design of high performance rockets is not only to use fuels yielding maximum energy per unit weight, but also to minimize the weight of inert parts of the rocket relative to that of the fuel therein. In this respect, means of steering rockets have been achieved heretofore at the expense of imparting a considerable weight penalty to the rocket. Probably the most successful and compact means of steering a rocket has comprised a thrust nozzle having a kind of ball-and-socket connection with the aft closure of the rocket case, permitting the entire nozzle to be swung by hydraulic actuators into any position in an imaginary cone about the axis of the rocket and thereby directing the flow of propulsive gases. This apparatus however has involved problems attendent not only with use of the necessarily large seals between the movable nozzle and the aft closure of the rocket, but also with the weight of the large, powerful actuators required to move the mass of an entire thrust nozzle.

The present invention is a compact means for altering the direction of the thrust vector of a rocket simply by rotating the throat section of an otherwise fixed thrust nozzle. This is accomplished by relatively small hydraulic actuators situated in cavities within the thrust nozzle walls, the rotatable throat section being seated in spherical relationship with adjacent parts of the nozzle.

Objects of the invention are to provide a compact, reliable, lightweight, and inexpensive means for steering a rocket.

Another object of the invention is to provide a means of steering a rocket that may be operated with minimal expenditure of energy, and, hence, by small actuators.

Other objects and advantages of the invention will become apparent as the following detailed description is read with reference to the accompanying drawings, wherein the same parts are designated with identical characters throughout the views.

Figures 1, 2, 3:
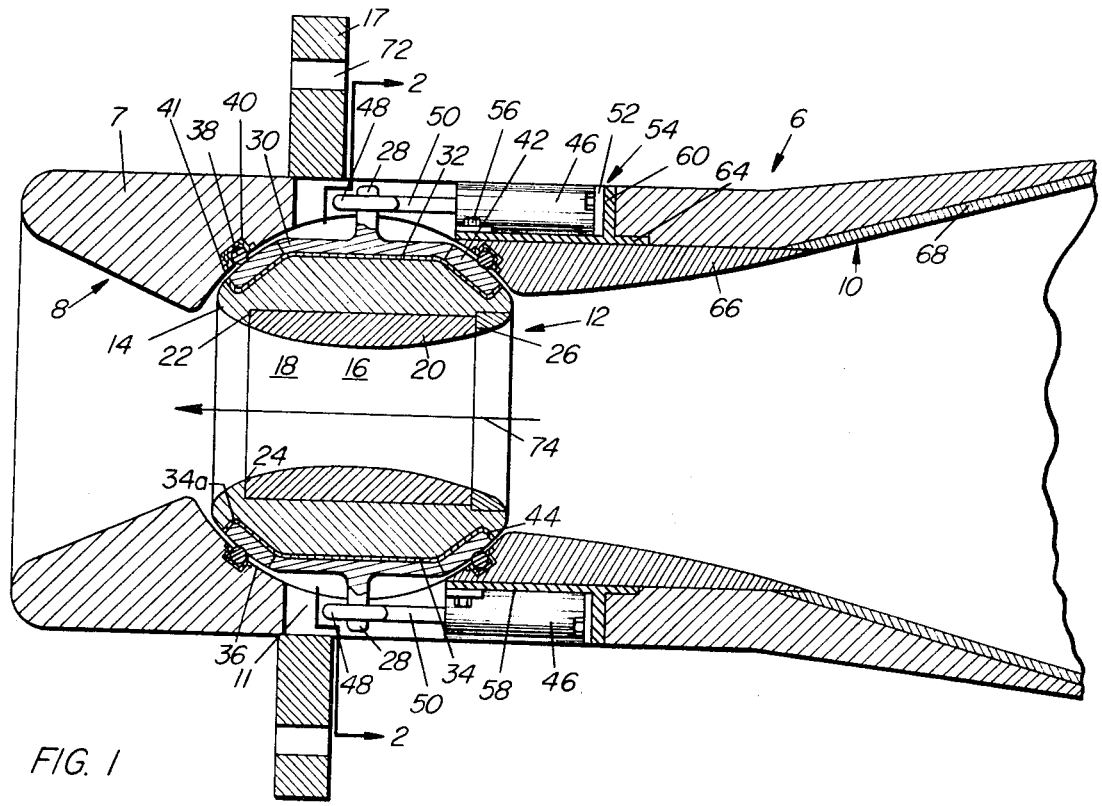
FIG. 1 is a sectional view taken along the central axis of a rocket nozzle comprising the present invention.
FIG. 2 is a full cross-sectional view of the invention taken on the line 2—2 of FIG. 1.
FIG. 3 is a fragmentary sectional view of the actuation means, taken on the line 3—3 of FIG. 2.

The preferred form of the invention, illustrated in the Figures, is a thrust nozzle 6 including an annular nozzle member 7, the interior surface of which defines a truncated, convergent cone 8 aligned with a truncated, divergent cone 10. An annular recess 11 is formed at the juncture of cones 8 and 10 by intersection of a spherical surface therewith. The rotatable throat section 12, seated in the recess 11, is essentially a spherical graphite body 14 having a hole 16 passing therethrough. A throat orifice 18 for the thrust nozzle 6 is defined by a forged tungsten annulus 20 seated in a recess 22 in the hole 16 of the graphite body 14. The recess 22 is formed by a small shoulder 24 on the upstream end of the hole 16 and by a small graphite annulus 26 rigidly fixed in the downstream end of the hole 16. Four studs 28 are spaced circumferentially at 90° intervals about the sphere 14 in a plane perpendicular to the axis of the nozzle 6. The studs 28 are mounted to the sphere 14 by steel plates 30 to which they are rigidly attached. The four sides of the sphere 14 are flattened at 32 and recessed to receive the steel plates 30. A layer 34 of thermal insulation between each steel plate 30 and the graphite body 14 prevents transmission of heat from the body 14 to the steel plate 30. This insulation 34 is bonded on one side to the steel and on the other to the graphite.

Bearing and sealing means between the surfaces 36 at which the annular nozzle member 7 and the rotatable throat section 12 are adjacent is provided by annular, elastomeric seals 38 seated in annular, steel channels 40 in the recess 11 near the edges thereof. The channels 40 are equipped with flanges 41 for better mounting in the graphite. Annular bearing members 42 of steel, having polished, spherical surfaces, are fixed in annular recesses 44 in the rotatable throat section 13. Annular layers 34a of thermal insulation lie between the bearing members 42 and the graphite body 14, and are bonded to the graphite and steel as are the layers 34. The bearing members 42 are sufficiently wide to provide bearing surfaces for the seals 38 as the throat section 12 is rotated. Alternatively, the seals 38 could be mounted in the surface of the rotating throat section 12 and corresponding bearing members 42 could be mounted in the annular recess 11.

Actuating means for rotating the throat section 12 is provided by four, double-acting, fluid-pressure cylinders 46 having loops 48 fixed to the actuation arms 50 thereof which, together with the studs 28, comprise connecting means to the throat section 12. Each loop 48 surrounds a corresponding stud 28 and acts as pivoting thrust bearing thereon. As the throat section 12 is rotated, the studs 28 not only pivot in the loops 48 but also slide therethrough. Each cylinder 46 is fixed to a mounting fixture 52 that is fastened in a cavity 54 in the side of the nozzle 6 by suitable means such as screws 56. The mounting fixture 52 is essentially a flat plate 58 having a vertical flange 60. Additional rigidity is provided by an extension 64 of the plate 58, confined between an annular sleeve 66 and the divergent cone 10 proper. The convergent-cone portion of the nozzle member 7 is ordinarily made of high density graphite, as is the sleeve 66, while the divergent cone 10 is preferably made of wound fiberglass impregnated with pressure-cured epoxy resin and lined with a layer 68 of thermal insulation such as chipped fiberglass or carbon cloth impregnated with epoxy resin also pressure-cured. The layer 34 of thermal insulation, protecting the bearing members 42 and the steel plates 30 from heat conducted through the graphite body 14, is of the same composition. The nozzle 6 may be attached to a rocket motor, not shown, by means of an annular flange 17 having a plurality of circumferentially-spaced holes 72 therein by which it may be bolted to the aft closure of a rocket.

In operation, rotation of the throat section 12 by the hydraulic cylinders 46, responsive to signals by means well known in the art, effectively steers the rocket. Rotation of the throat section 12 alters the direction of the thrust vector 74 of the propulsive gases to create a lever arm or moment about the center of mass of the rocket so that the rocket will turn in a direction opposite that of the thrust vector. Since rotation of the throat section 12 may be effected by rotational components of force acting in two perpendicular planes intersecting at the axis of the rocket, it may be seen that these components may combine to divert the thrust vector 74 into any position within an imaginary cone defined by the angular distance through which the throat section 12 is designed to rotate and by the confines of the divergent cone 10. It may be noted that minimal energy is required to alter the direction of the thrust vector at the throat portion of the nozzle, as taught herein, since a minimal mass is moved in the process. Hence, the actuators 46 for rotating the throat section 12 may be relatively small.

In certain applications, as in a rocket having a plurality of nozzles, effective steering of the rocket may only require that the thrust vector passing through each nozzle be rotated one plane. Hence, only one actuating means is necessary for each nozzle 6 in such applications. Also, although four actuators 46 are shown in the preferred embodiment, it is obvious that two could be sufficient.

Although the preferred embodiment of the invention has been described with considerable specificity with regard to detail, it should be noted that many such details may be altered without departing from the scope of the inventive concepts defined in the appended claims. For example, the tungsten annulus 20 is unnecessary for use with certain fuels, and other materials may be used, in certain applications, instead of those cited.

What is claimed is:

1. A thrust nozzle for a rocket, comprising:

an annular nozzle member internally defining a convergent cone adjoining a divergent cone, an annular recess, having spherical surfaces therein, at the juncture of said cones;

a rotatable throat section seated in said recess, having a throat orifice therethrough and spherical surfaces adjacent those of said recess;

actuation means on said annular nozzle member for rotating said throat section; and connecting means on said throat section for connecting said actuation means thereto, whereby the direction of propulsive gases passing through said thrust nozzle may be changed, for steering said rocket, simply by rotating said throat section while said nozzle member remains fixed relative to said rocket.

2. The thrust nozzle of claim 1 wherein said rotatable throat section comprises:

a graphite body having a hole therethrough; and a tungsten annulus fixed in said hole to define said throat orifice.

3. The thrust nozzle of claim 1 wherein said actuation means comprises a fluid-pressure cylinder.

4. The thrust nozzle of claim 3 wherein said connecting means comprises:

a stud mounted on said throat section; and a thrust bearing attached to the actuation arm of said fluid-pressure cylinder and surrounding said stud, said thrust bearing permitting both pivotal and sliding action of said stud therethrough.

5. The thrust nozzle of claim 3 wherein said annular nozzle member has a cavity inside thereof and said fluid-pressure cylinder is mounted in said cavity for compactness aerodynamic advantages.

6. The thrust nozzle of claim 1 further including:

a pair of annular seals each of which is mounted substantially perpendicular to the axis of said nozzle in one of the surfaces at which said rotatable throat section and said annular nozzle member are adjacent; and a pair of annular bearing members each having a spherical surface and mounted in one of said adjacent surfaces opposite one of said seals to provide a bearing surface for said annular seal.

7. The thrust nozzle of claim 6 wherein said bearing members are made of steel and further including a layer of thermal insulation between each of said bearing members and the surface on which it is mounted, to protect said bearing member from conducted heat.

* * * * *